US005673725A

United States Patent [19]

Russell et al.

[11] Patent Number: 5,673,725

[45] Date of Patent: Oct. 7, 1997

[54] AIR GAP DEVICE WITH INTERCHANGEABLE PARTS

[75] Inventors: William Knight Russell, Newport Beach; Paul M. Beldham, Mission Viejo; Jeffrey J. Lukawski, Laguna Niguel; Christopher W. Nesselroad, Lake Forest, all of Calif.

[73] Assignee: Knight Equipment International, Inc., Costa Mesa, Calif.

[21] Appl. No.: 669,861

[22] Filed: Jun. 10, 1996

[51] Int. Cl.[6] .................. F16K 11/00

[52] U.S. Cl. .................. 137/888; 417/198

[58] Field of Search .................. 137/564.5, 101.11, 137/888, 889, 205.5; 417/76, 151, 198

[56] References Cited

U.S. PATENT DOCUMENTS 2,575,513 11/1951 Fox .................. 417/151

5,159,958 11/1992 Sand .................. 137/888

5,253,677 10/1993 Sand .................. 137/888

5,518,020 5/1996 Nowicki .................. 137/888

5,522,419 6/1996 Sand .................. 137/888

*Primary Examiner*—Denise L. Ferensic

*Assistant Examiner*—Ramyar M. Farid

*Attorney, Agent, or Firm*—Harry G. Weissenberger, Inc.

[57] ABSTRACT

An air gap, venturi-type mixer for mixing a liquid chemical with water includes a readily field-exchangeable collimator, water seal and venturi unit to accommodate different flow rates. The venturi unit includes a funnel with slightly inclined walls that direct a misaligned collimated water stream into the vena contracta of the venturi without reducing its speed or entraining any air.

10 Claims, 4 Drawing Sheets

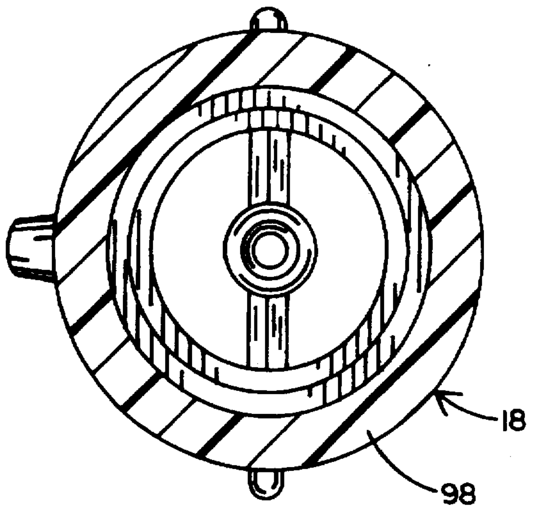
FIG. 4
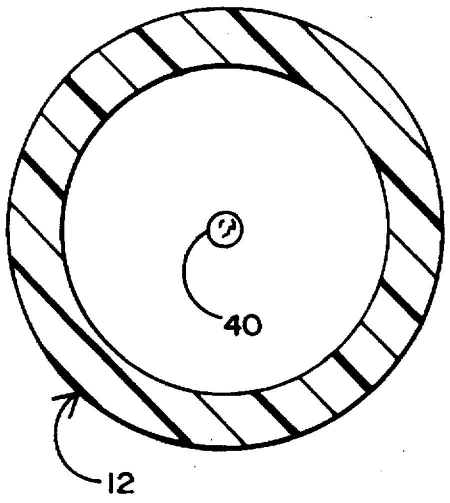
FIG. 3
FIG. 5
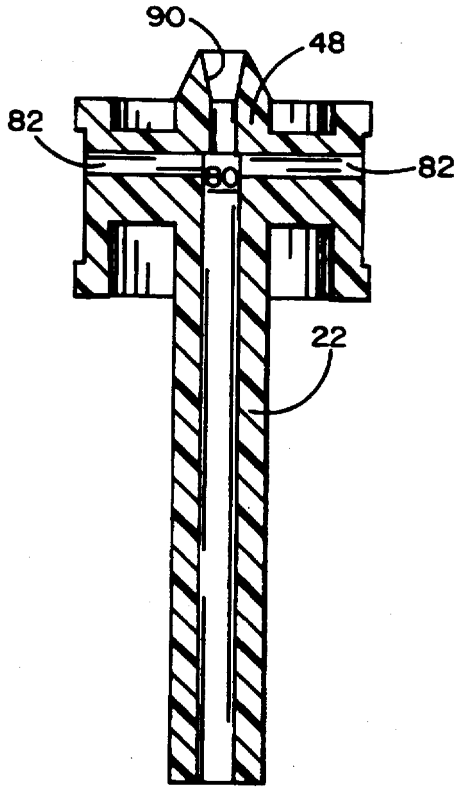
FIG. 7
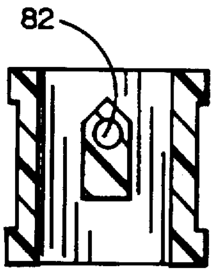
FIG. 6
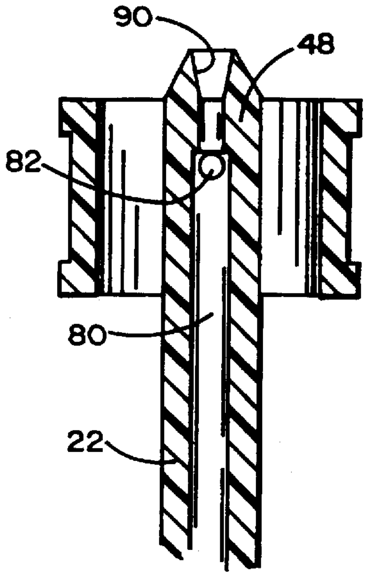

AIR GAP DEVICE WITH INTERCHANGEABLE PARTS

FIELD OF THE INVENTION

This invention relates to air gap anti-siphon devices for venturi-type liquid mixers, and more particularly to such a device in which alignment is non-critical, and whose parts are readily interchangeable in the field to achieve different flow rates.

BACKGROUND OF THE INVENTION

Mixing devices which use the vacuum created by a venturi to draw a liquid chemical into a rapidly moving water stream are well known. Such devices are commonly used, for example, to produce a chemical solution from a supply of concentrated liquid chemical in an industrial application. In order to prevent an accidental aspiration of chemical into the water supply, plumbing codes universally require that a substantial protection such as an air gap (at least 2.5 cm) be interposed between the venturi and the water line. Such an air gap device is disclosed, for example, in U.S. Pat. No. 5,159,958 to Sand.

In the commercial use of these mixers, it is often desirable to be able to change the flow rate of the mixer without having to install a whole new mixer. However, in conventional constructions, the correct alignment of the water stream with the venturi throat is so critical to the connect functioning of the device that it was considered unwise to allow field modification of any pros of the mixer.

Another problem with prior art mixers such as that of U.S. Pat. No. 5,159,958 was their tendency to draw air through the splash shield due to the nozzle effect of the downwardly inwardly inclined splash shield configuration. This is undesirable because air entrained into the water-chemical mixture causes it to foam.

SUMMARY OF THE INVENTION

The invention produces a simple, effective field-modifiable air gap mixer by providing readily removable and exchangeable collimators, water seals and venturi units which fit into a universal two-piece housing and are not orientation-sensitive. Although the fit of the parts is such that a misalignment of the water stream is unlikely, a novel funnel-like lead-in to the venturi is provided to align a slightly misaligned water stream without loss of flow velocity prior to entering the venturi. Free water particles in the venturi chamber are prevented from entering the air gap chamber by passing the water stream between the air gap chamber and the venturi chamber through an elongated passage only slightly wider than the water stream, to effectively provide a water seal between the air gap chamber and the venturi chamber.

BRIEF DESCRIPTION OF THE DRAWINGS

FIG. 3 is a transverse section along line 3—3 of FIG. 2;

FIG. 4 is a transverse section along line 4—4 of FIG. 2;

FIG. 5 is an enlarged axial section of the venturi unit of this invention;

FIG. 6 is a vertical section along line 6—6 of FIG. 2;

FIG. 7 is a vertical section along line 7—7 of FIG. 2; and

DESCRIPTION OF THE PREFERRED EMBODIMENT

Figure 1:
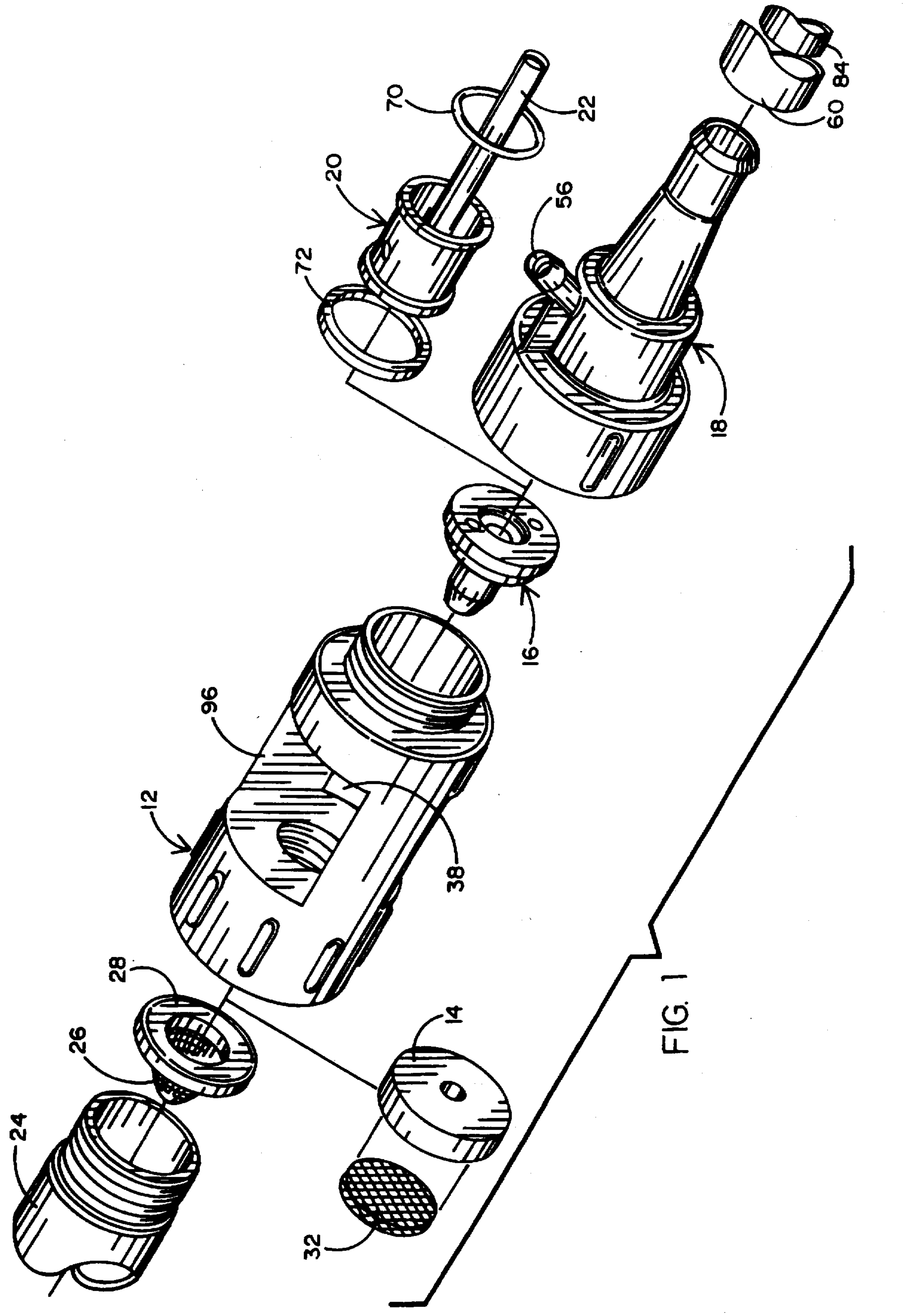
FIG. 1 is an exploded perspective view of the device of this invention.

FIG. 1 shows the device 10 of this invention in exploded form. The air gap section 12 contains the collimator 14 and the water seal insert 16, while the venturi section 18 contains the venturi unit 20 and the mixing tube 22. The collimator 14, water seal insert 16, and venturi unit 20 with tube 22 are interchangeable in the field to produce devices with a variety of flow rates from the same air gap section 12 and venturi section 18.

Figure 2:
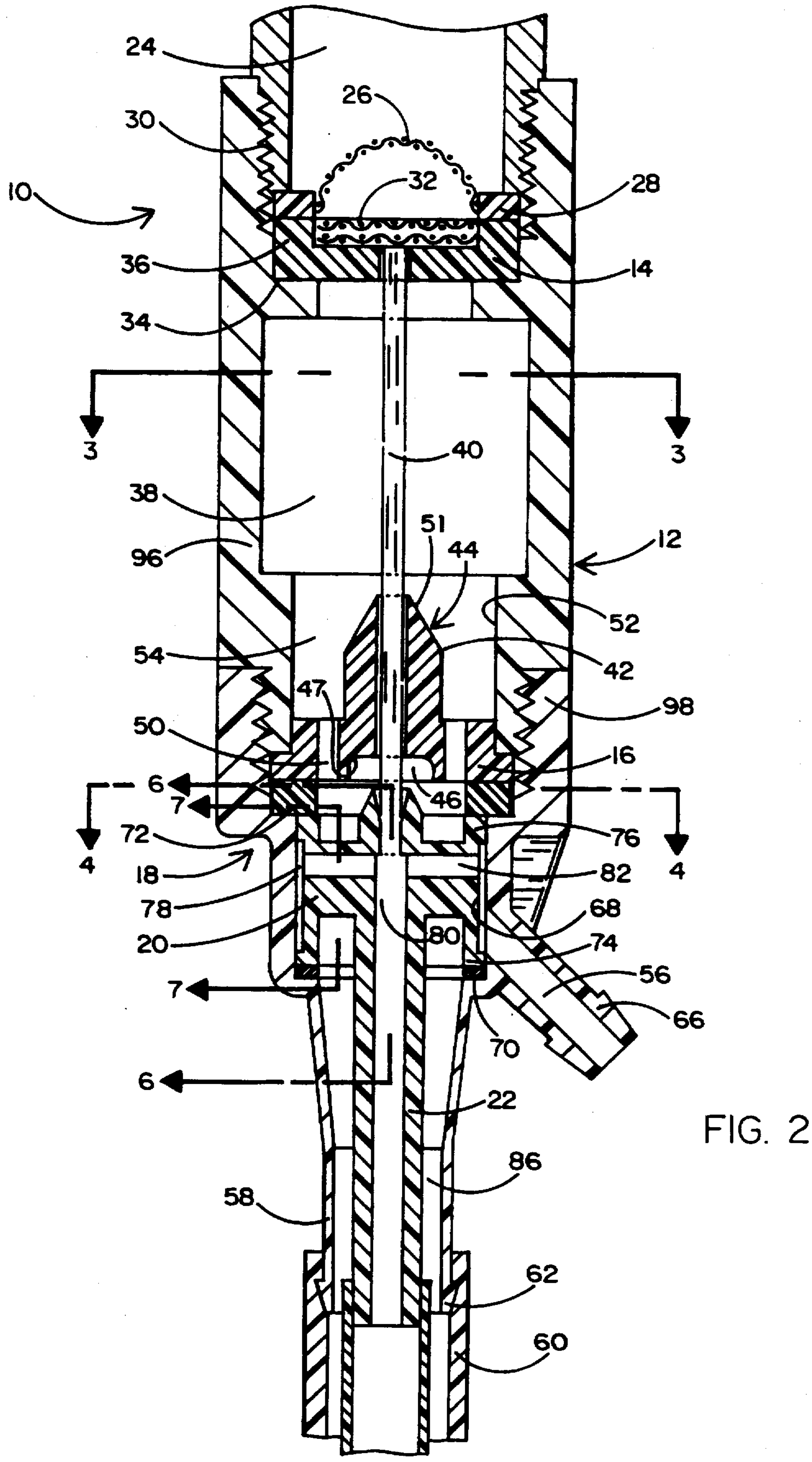
FIG. 2 is an axial section of the device of FIG. 1.

The details of the inventive structure are shown in FIGS. 2 through 4. Water from a standard water pipe 24 enters the air gap section 12 through a first particle screen 26 embedded in the entry gasket 28. The entry gasket 28, which is wedged under the screwthreads 30 by which the air gap section 12 is attached to the water pipe 24, locks the collimator 14 in place. The collimator 14, which includes a pair of collimator screens 32, 34, uses conventional technology to emit a highly collimated vertical water stream whose diameter remains substantially constant from the collimator 14 to the venturi unit 20. The collimator 14 fits into the opening 36 of air gap section 12 tightly enough to essentially maintain collimator 14 in a predetermined alignment with air gap section 12, yet loosely enough to allow its easy removal without tools in order to change flow rates.

The air gap section 12 is exposed to atmosphere through the large windows 38. The collimated water stream 40 descends through this air gap 40 for a distance of approximately 2.5 cm before entering the passage 42 of the water seal insert 16. The diameter of passage 42 is just barely (about 0.75 mm) greater than the diameter of the collimated water stream 40. The length of the passage 42 is preferably on the order of about 10 mm. The passage 42 is formed in an upstanding post 44 of the water seal insert 16. At its lower end, the passage 42 terminates in a shallow recess 46 which receives any splashback from the venturi tip 48. The walls 47 of the recess 46 act as a depending flange or shroud which prevents any splashback from returning into the air gap section 12 through the drain holes 50.

The small clearance between the water stream 40 and the walls of passage 42, coupled with the length of passage 42, effectively forms a water seal between the air gap section 12 and the venturi section 18 by preventing any splashback or spray droplets close to the water stream 40 from rising back into the air gap section 12. However, the clearance between the water stream 40 and the walls of passage 42 is sufficient to prevent a venturi effect at the interface of passage 42 and recess 46, so that air will not be drawn into the venturi section 18 through the drain holes 50, the purpose of which is merely to drain any side splash which falls into the annular trough 54 when the water stream 40 is first turned on and is not yet collimated. In the latter case, any uncollimated water droplets striking the top of the water seal outside the passage 42 are deflected downwardly into the annular trough 54 by the steep (>60° from the horizontal) inclination of the annular outer wall 51 of the water seal 16 surrounding the entrance to the passage 42, rather than bouncing back toward the openings 38.

The water seal insert 16 is positioned at the bottom end of air gap section 12 and, like the collimator 14, fits upwardly into the bore 52 of the air gap section 12 snugly enough to be firmly aligned with collimator 14 yet loosely enough to be readily removed and exchanged for another size when the venturi section 18 is unscrewed from the air gap section 12.

The venturi section 18 contains the venturi unit 20, shown in more detail in FIGS. 5–7. It also contains the chemical inlet 56, the mixing tube or diffuser 22, and the mixer outlet 58. An outlet hose 60 can be slipped over the barbs 62 of the outlet 58 to convey the water-chemical mixture to a place of use. The chemical can be supplied to inlet 56 through a supply hose 64 that can be slipped over the barbs 66.

Like the collimator 14 and the water seal insert 16, the venturi unit 20 fits into the bore 68 of the venturi section 18 tightly enough to maintain correct alignment with the water stream 40, but loosely enough to permit its easy removal so that it can be exchanged for a different size. When inserted, venturi unit 20 is held in place and sealed by O-ring 70 and sealing washer 72. The O-ring 70 and sealing washer 72 cooperate with the annular flanges 74 and 76, respectively, to provide an annular manifold 78 which is in communication with the chemical inlet 56, and from which chemical can reach upper portion 22 of the diffuser 22 through feed passages or ports 82. Two or more radial, equally spaced ports 82 are provided for easy dispensing and symmetrical mixing of viscous chemicals, and also so that regardless of the angular position of venturi unit 20 in the bore 68, at least a portion of the liquid chemical drawn from inlet 56 need not flow through more than a small section of the annular manifold 78.

The above-described construction of venturi unit 20 prevents water or chemical from leaking upwardly or downwardly out of the closed annular manifold 78 while preserving the quick interchangeability of venturi units 20, and making the angular orientation of venturi unit 20 immaterial. The resilient O-ring 70 and sealing washer 72 provide a tight seal at the top and bottom of venturi unit 20, thereby increasing the vacuum in the venturi by 18–20 kPa over that produced by the sealing ability of flanges 74, 76 alone.

If desired, a defoaming tube 84 may be used to extend the diffuser tube 22 into the outlet hose 60 so as to reduce the velocity of the chemical mixture and thereby reduce the amount of foam created when the mixture hits the air inside the outlet hose 60. Any splashover from the venturi tip 48 drains into the outlet hose 60 through the annular drain conduit 86.

Figure 8A:
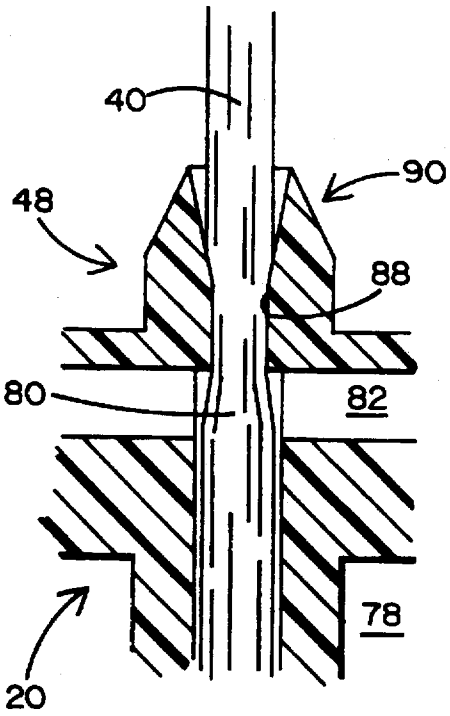
FIG. 8*a* and 8*b* are vertical sections of the venturi tip illustrating the functioning of the invention.

The venturi tip 48, as best shown in FIG. 5, includes a venturi throat or vena contracta 88, a mixing chamber 80 into which chemical is drawn through the feed passages 82 by the vacuum produced by the water exiting from the venturi throat 88 directly into the diffuser 22, and a funnel 90. The inner walls of the interiorly and exteriorly frustoconical funnel 90 are inclined at an angle of about 5 to 15°, preferably about 10°, from the vertical. The funnel 90 is preferably slightly longer than the venturi throat 88. The funnel 90 functions as follows: The vena contracta 88 of the venturi tip 48 is of slightly lesser diameter than the water stream 40. Thus, when the water stream 40 is in correct alignment with the venturi tip 48 (FIG. 8*a*), the vena contracta 88 fills completely with water, which is necessary inasmuch as any air in the vena contracta defeats the vacuum produced by the venturi.

Figure 8B:
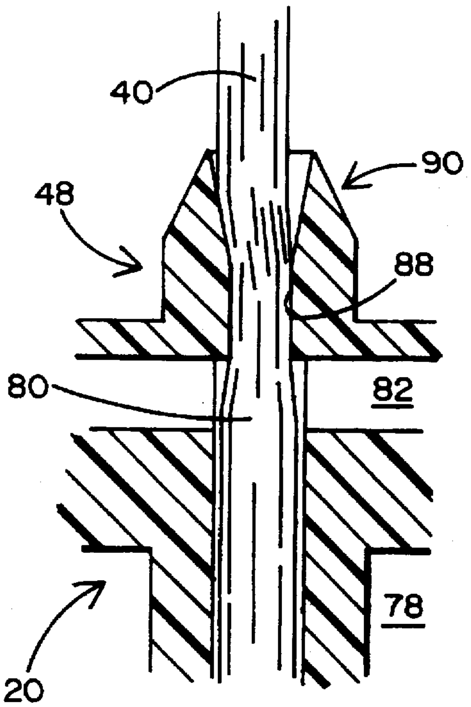

If the water stream 40 becomes slightly misaligned with the venturi tip 48 (FIG. 8*b*), the slight inclination of the walls of funnel 90 causes the water stream 40 to be gently diverted into correct alignment without slowing before it enters the vena contracta 88. Consequently, the inclination of the funnel walls within the range specified above causes the venturi tip 48 to be misalignment-tolerant—an important property in a field-serviceable device.

If the angle of inclination of the walls of funnel 90 is too small, or the funnel 90 is omitted, the venturi unit 20 becomes misalignment-intolerant (if the water stream 40 is just slightly larger than the vena contracta 88) due to incomplete filling of the vena contracta 88, or splash-heavy (if the water stream 40 is substantially larger than the vena contracta 88). If the angle of inclination is too large, the venturi unit 20 again becomes misalignment-intolerant because a misaligned water stream 40 strikes the wall of funnel 90 at a sufficient angle to not only greatly increase backsplash, but to also disrupt the water stream 40 and reduce the vacuum-producing flow speed of the water in the vena contracta 88.

The mixer 10 of this invention can easily be converted in the field to a different flow rate. In order to do this, the air gap section housing 96 is first unscrewed from the water supply pipe 24 and from the venturi section housing 98. The collimator 14 and water seal insert 16 are pushed out of the air gap section housing 90, and the venturi unit 20 is pulled out of the venturi section housing 98. A new collimator 14 and water seal insert 16 are then pushed into the air gap housing 90, and a new venturi unit 20 is pushed into the bore 68 of venturi section housing 98. The venturi housing 98 and air gap housing 96 are then screwed back together, and the air gap housing 96 is screwed back onto the water supply pipe 24.

Because the collimator 14, water seal passage 42, venturi tip 48 and annular space or recess 78 of the venturi unit 20 are circumferentially symmetrical about the axis of the mixer 10, the angular orientation of the replaceable parts within the housing 96 and 98 is immaterial. The collimator 14, water seal insert 16 and venturi unit 20 fit deeply enough into matching bores in the housings 96, 98 to be in proper alignment when inserted into place; however, as explained above, the mixer of this invention is tolerant of some misalignment.

It is understood that the exemplary air gap device described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A non-siphoning venturi-type liquid mixer, comprising:
   a) a collimator arranged to produce a collimated water stream;
   b) an air gap section open to the atmosphere, said water stream passing through said air gap section to prevent reverse flow of water through said collimator;
   c) a source of liquid chemical;
   d) a venturi section under said air gap section, said venturi section containing a venturi unit arranged to draw said liquid chemical from said source into said water stream and to mix it therewith;
   e) said venturi unit including:
      i) a vena contracta having a diameter slightly smaller than said collimated water stream; and
      ii) a funnel means receiving said water stream and directing it into said vena contracta;
      iii) the inclination of the walls of said funnel means from the vertical being sufficiently small to direct a misaligned water stream into said vena contracta without substantially disrupting or slowing said water stream, but sufficiently large to allow said venturi unit to tolerate a substantial misalignment of said water stream without causing air to enter said vena contracta; and f) a water seal interposed between said air gap section and said venturi section, said water seal including an elongated vertical passage of a diameter not substantially larger than the diameter of said collimated water stream, wherein said passage is formed in an upstanding post having an entrance at its top, said entrance being surrounded by sloping outer walls of said post, said water stream being arranged to pass through said passage, said water seal further including an annular trough formed around said vertical passage, said annular trough arranged adjacent to said air gap section, said water seal having drain apertures formed therein for draining said trough, said water seal further including an annular flange depending therefrom and surrounding the tip of said venturi unit so as to prevent any splash from said venturi tip from entering said drain apertures.

2. The mixer of claim 1, in which said inclination of said funnel walls is substantially between 5° and 15°.

3. The mixer of claim 2, in which said inclination is substantially 10°.

4. The mixer of claim 1, in which said venturi section has an axial bore for receiving said venturi unit, said venturi unit when seated in said bore defining a closed annular manifold communicating with the interior of said venturi unit and with said source of chemical.

5. The mixer of claim 4, in which said communication between said annular manifold and the interior of said venturi unit is established by a plurality of ports extending between said manifold and said interior.

6. The mixer of claim 5, in which there are at least two substantially equally spaced ports.

7. The mixer of claim 4, in which said manifold is tightly sealed at its top and bottom by resilient annular sealing elements.

8. The mixer of claim 1, in which said air gap section and said venturi section each have a housing, said housings being arranged to be releasably connected to each other to allow the removal of said collimator, water seal and venturi unit when said housings are disconnected from each other.

9. The mixer of claim 1, in which said venturi unit has a frustoconical top portion tapering toward the top of said venturi unit, the top edge of said frustoconical portion being circular and being also the top edge of said funnel.

10. The mixer of claim 1, wherein said outer walls slope downward relative to a horizontal axis at an angle greater than substantially 60°.

* * * * *